Patented Dec. 22, 1953

2,663,680

UNITED STATES PATENT OFFICE 2,663,680

EXTRACTIVE DISTILLATION OF ALLYL ALCOHOL FROM n-PROPYL ALCOHOL

Nat C. Robertson, Corpus Christi, Tex., assignor to Celanese Corporation of America, a corporation of Delaware No Drawing. Application January 8, 1949, Serial No. 69,990

5 Claims. (Cl. 202—39.5)

This invention relates to the separation of alcohols and relates more particularly to an improved process for the separation of n-propyl alcohol from allyl alcohol.

An object of this invention is the provision of a novel process for the separation by distillation methods of n-propyl alcohol from a mixture of n-propyl alcohol and allyl alcohol.

Another object of this invention is to provide an improved process for the separation of n-propyl alcohol from a mixture of n-propyl alcohol and allyl alcohol whereby both n-propyl alcohol and allyl alcohol of a high degree of purity may be obtained.

Other objects of this invention will appear from the following detailed description.

The vapor phase, partial oxidation of aliphatic hydrocarbons such as propane or butane, or mixtures thereof, employing air or oxygen as the oxidizing agent, yields a complex mixture of products including formaldehyde, acetaldehyde, methanol, propionaldehyde, allyl alcohol, isopropyl alcohol, n-propyl alcohol, isobutanol, secondary butanol, n-butanol, acetone, methyl ethyl ketone, methylal, acrolein, tetrahydrofuran, methyl formate and other esters, formals, acetals and various oxides, as well as numerous other aliphatic compounds, in varying amounts. In order to separate the complex mixture of oxidation products and to purify each of the components so that the same will be suitable for commercial use, an intricate products purification scheme is necessary. The purification involves a series of operations yielding a number of crude fractions each containing a plurality of compounds. One such fraction obtained comprises essentially n-propyl alcohol and allyl alcohol. Since the boiling points of said alcohols differ by but a small fraction of a degree, separation of the mixture by an ordinary straight fractional distillation is not feasible.

I have now found that by subjecting a mixture of n-propyl alcohol and allyl alcohol to an extractive distillation employing water as the extractant, the relative volatility of the allyl alcohol present in the mixture is decreased substantially and n-propyl alcohol of a purity of over 97% by weight on an alcohol basis may be separated therefrom by said distillation.

In accordance with my novel process, a mixture comprising essentially n-propyl alcohol and allyl alcohol is charged to a fractionating column provided with suitable bubble cap trays or packing to ensure intimate vapor-liquid contact and, while being subjected to distillation, a stream of water is introduced into the fractionating column. The water is fed to the column above the point or tray therein at which the feed is introduced and also above the point or tray at which the reflux is introduced. The amount of water introduced into the column should be sufficient to maintain a 60 to 90% by weight water concentration in the liquid phase, i. e. at a reflux ratio of 5 to 1 to 30 to 1. Preferably, the water concentration is maintained at about 75% by weight at a reflux ratio of about 10 to 1. The overhead product comprises a mixture of n-propyl alcohol and water while the product removed from the reboiler of the fractionating column comprises an aqueous solution of allyl alcohol. The latter solution may be separated into its components by a straight fractional distillation in a second fractionating column, the water separated from the mixture being advantageously recycled to the water extractive distillation column to aid in effecting further separation of n-propyl alcohol from the n-propyl-allyl alcohol mixture.

In order further to illustrate my invention, but without being limited thereto, the following example is given:

*Example*

100 parts by weight per minute of a mixture consisting of 35% by weight of n-propyl alcohol, 35% by weight of allyl alcohol and 30% by weight of water is introduced into a 60 plate fractionating column at about the 30th tray from the top and 1100 parts by weight per minute of water heated to a temperature of 80–85° C. introduced into the column at the top tray. The column is heated by a steam coil in the reboiler. The vapor temperature at the top tray is maintained at 87 to 93° C. and the reflux ratio at 10/1, the reflux being introduced into the column at the first tray from the top. The water entering the column is regulated so that the water concentration in the liquid phase on each tray is about 75% by weight. The overhead product comprises a solution of n-propyl alcohol containing 30 to 40% by weight of water, the n-propyl alcohol therein being of a purity of about 97% by weight. Fractional distillation of the still residue yields allyl alcohol of a purity of over 99% by weight, the water separated in said fractional distillation being preferably recycled to the water extractive distillation column. The aqueous n-propyl alcohol solution may be dehydrated by employing a pentane extraction step followed by distillation of the pentane solution of n-propyl alcohol thus obtained.

It is to be understood that the foregoing detailed description is given merely by way of illustration and that many variations may be made therein without departing from the spirit of my invention.

Having described my invention, what I desire to secure by Letters Patent is:

1. Process for the separation of a mixture comprising essentially n-propyl alcohol and allyl alcohol by distillation operations, which comprises subjecting said mixture to an extractive fractional distillation employing water as the extractant taking aqueous n-propyl alcohol off overhead as one fraction, separating said n-propyl alcohol solution obtained as the overhead product by extracting the same with pentane, and separating an aqueous solution of allyl alcohol as another fraction.

2. Process for the separation of a mixture comprising essentially n-propyl alcohol and allyl alcohol by distillation operations, which comprises subjecting said mixture to an extractive fractional distillation employing water as the extractant and maintaining the water concentration in the liquid phase at about at least 60% by weight, taking aqueous n-propyl alcohol off overhead as one fraction, separating said n-propyl alcohol solution obtained as the overhead product by extracting the same with pentane, and separating an aqueous solution of allyl alcohol as another fraction.

3. Process for the separation of a mixture comprising essentially n-propyl alcohol and allyl alcohol by distillation operations, which comprises subjecting said mixture to an extractive fractional distillation employing water as the extractant and maintaining the water concentration in the liquid phase at about at least 60% by weight, taking aqueous n-propyl alcohol off overhead as one fraction, separating an aqueous solution of allyl alcohol as another fraction, separating said n-propyl alcohol solution obtained as the overhead product by extracting the same with pentane, distilling an allyl alcohol-water azeotrope from the last-named fraction and recycling the water separated from the allyl alcohol to effect further extractive distillation of the mixture of n-propyl alcohol and allyl alcohol.

4. Process for the separation of a mixture comprising essentially n-propyl alcohol and allyl alcohol by distillation operations, which comprises subjecting said mixture to an extractive fractional distillation employing water as the extractant and a reflux ratio of 5/1 to 30/1 while maintaining the water concentration in the liquid phase at about 60 to 90% by weight, taking aqueous n-propyl alcohol off overhead as one fraction, separating an aqueous solution of allyl alcohol as another fraction, distilling an allyl alcohol-water azeotrope from the last-named fraction, recycling the water separated from the allyl alcohol to effect further extractive distillation of the mixture of n-propyl alcohol and allyl alcohol and separating the n-propyl alcohol solution obtained as the overhead product by extracting the same with pentane.

5. Process for the separation of a mixture comprising essentially n-propyl alcohol and allyl alcohol by distillation operations, which comprises subjecting said mixture to an extractive fractional distillation employing water as the extractant and a reflux ratio of 10/1 while maintaining the water concentration in the liquid phase at about 75% by weight, taking aqueous n-propyl alcohol off overhead as one fraction, separating an aqueous solution of allyl alcohol as another fraction, distilling an allyl alcohol-water azeotrope from the last-named fraction, recycling the water separated from the allyl alcohol to effect further extractive distillation of the mixture of n-propyl alcohol and allyl alcohol and separating the n-propyl alcohol solution obtained as the overhead product by extracting the same with pentane.

NAT C. ROBERTSON.

References Cited in the file of this patent

UNITED STATES PATENTS

| Number | Name | Date |
|---|---|---|
| 996,328 | Guillaume | June 27, 1911 |
| 2,290,442 | Metzl | July 21, 1942 |
| 2,379,110 | Sounders | June 26, 1945 |
| 2,511,847 | Harney et al. | June 20, 1950 |
| 2,551,584 | Carlson et al. | May 8, 1951 |
| 2,551,593 | Gilliland et al. | May 8, 1951 |
| 2,551,626 | Morrell et al. | May 8, 1951 |